(12) United States Patent
Ramasamy et al.

(10) Patent No.: US 11,017,103 B2
(45) Date of Patent: May 25, 2021

(54) SECURELY TRANSFERRING COMPUTATION IN A DISAGGREGATED ENVIRONMENT USING A PROCESSOR GROUP KEY

(71) Applicant: INTERNATIONAL BUSINESS MACHINES CORPORATION, Armonk, NY (US)

(72) Inventors: HariGovind V. Ramasamy, Ossining, NY (US); John A. Bivens, Ossining, NY (US); Ruchi Mahindru, Elmsford, NY (US); Valentina Salapura, Chappaqua, NY (US); Min Li, San Jose, CA (US); Yaoping Ruan, White Plains, NY (US); Eugen Schenfeld, South Brunswick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 356 days.

(21) Appl. No.: 16/204,463

(22) Filed: Nov. 29, 2018

(65) Prior Publication Data
US 2020/0175183 A1    Jun. 4, 2020

(51) Int. Cl.
*H04L 9/08* (2006.01)
*G06F 21/74* (2013.01)
(Continued)

(52) U.S. Cl.
CPC .......... *G06F 21/606* (2013.01); *G06F 21/30* (2013.01); *H04L 9/002* (2013.01); *H04L 9/0822* (2013.01); *H04L 9/0891* (2013.01);
*H04L 9/0894* (2013.01); *H04L 9/30* (2013.01); *G06F 2221/2149* (2013.01); *H04L 9/008* (2013.01); *H04L 2209/46* (2013.01)

(58) Field of Classification Search
None
See application file for complete search history.

(56) References Cited

U.S. PATENT DOCUMENTS 8,972,746 B2 * 3/2015 Johnson ................ G06F 21/645
713/189
2015/0149764 A1 5/2015 Charan et al.
(Continued)

FOREIGN PATENT DOCUMENTS

WO    2014151397 A1    9/2014

*Primary Examiner* — Fatoumata Traore
(74) *Attorney, Agent, or Firm* — Griffiths & Seaton PLLC (57) ABSTRACT

A group of processors in a processor pool comprise a secure "enclave" in which user code is executable and user data is readable solely with the enclave. This is facilitated through the key management scheme described that includes two sets of key-pairs, namely: a processor group key-pair, and a separate user key-pair (typically one per-user, although a user may have multiple such key-pairs). The processor group key-pair is associated with all (or some define subset of) the processors in the group. This key-pair is used to securely communicate a user private key among the processors. The user private key, however, is not transmitted to non-members of the group. Further, preferably the user private key is refreshed periodically or upon any membership change (in the group) to ensure that non-members or ex-members cannot decipher the encrypted user key.

12 Claims, 5 Drawing Sheets

(51) Int. Cl.
    *G06F 21/60*     (2013.01)
    *H04L 9/00*     (2006.01)
    *G06F 21/30*     (2013.01)
    *H04L 9/30*     (2006.01)

(56) References Cited

U.S. PATENT DOCUMENTS

| | | | |
|---|---|---|---|
| 2015/0379297 A1* | 12/2015 | Hunt | H04L 63/0442 726/26 |
| 2016/0006573 A1 | 1/2016 | Wu et al. | |
| 2017/0372076 A1* | 12/2017 | Poornachandran | G06F 21/74 |
| 2018/0330079 A1* | 11/2018 | Gray | H04L 9/3247 |

\* cited by examiner

SECURELY TRANSFERRING COMPUTATION IN A DISAGGREGATED ENVIRONMENT USING A PROCESSOR GROUP KEY

BACKGROUND OF THE INVENTION

Technical Field

The present invention relates generally to data processing systems in a data center operating environment.

Background of the Related Art

Digital data sometimes is characterized as being in one of three stages: data-in-use, data-in-motion, and data-at-rest. Data-in-use refers to data in computer memory. Because of its nature, data-in-use is of increasing concern to businesses, government agencies and other institutions. In particular, data-in-use (i.e., in memory) often contains sensitive data including, without limitation, digital certificates, encryption keys, intellectual property (software algorithms, design data), and personally identifiable information. Thus, compromising data-in-use enables access to encrypted data-at-rest and data-in-motion. For example, an entity with access to random access memory can parse that memory to locate the encryption key for data-at-rest. Once the entity has obtained that encryption key, it can decrypt encrypted data-at-rest. Other threats to data-in-use can come in the form of cold boot attacks, malicious hardware devices, rootkits and boot kits.

Generalizing, security needs to be applied to all data when possible; hence, data should be encrypted in any state it is located, including in memory, in storage (disk, flash, tape, etc.), as well as when traveling from place to place through a network. Keys that are used for this encryption, however, may be placed in different locations as long as only the user owning the data can access such keys and data.

Computing resources are usually pre-configured by vendors at fixed levels of security configurations, there may be no special hardware security measures available for protecting data-in-use. When security measures are present, they are usually inflexible, they cannot be dynamically scaled up or down to match workload characteristics, and/or they are expensive.

Generalizing, data-in-use typically often is protected in one of several ways. Encryption, which prevents data visibility in the event of its unauthorized access or theft, is commonly used to protect data-in-motion and data-at-rest, and it is increasingly recognized as a preferred method for protecting data-in-use as well. To this end, there have been multiple projects that propose or provide solutions to encrypt memory. Thus, for example, it is known to encrypt memory such that only the user program can access it; this is achieved via a key that is placed in a special hardware location at the processor side and that, for each memory read or write, can be used to decrypt or encrypt the data. Other commercial software products, such as PrivateCore vCage, provide attestation along with full memory encryption for x86 servers. Techniques to provide full memory encryption implementations on a mobile general purpose commodity processor (e.g., x86 and ARM) have also been described. One approach involves using an ARM Cortex A8 processor as a substrate upon which a full memory encryption solution is built. Using this technique, process segments (for example, stack, code or heap) can be encrypted individually or in composition, and this solution provides both confidentiality and integrity protections of code and data that are encrypted everywhere outside the CPU boundary.

Another approach to protecting data-in-use is CPU-based key storage. In this approach, operating system kernel patches modify the operating system so that CPU registers are used to store encryption keys in lieu of holding encryption keys in RAM. In particular, the keys are held inside the CPU rather than in RAM so that data-at-rest encryption keys are protected against attacks that might otherwise compromise encryption keys in memory. While this approach does not protect all data-in-use, it does protect against cold boot attacks.

Still another approach to protecting data-in-use is an "enclave," which are private regions in memory. Enclave data is encrypted while in RAM but available as clear text inside the CPU and CPU cache. An enclave approach differs from simply memory encryption in that it uses special registers and circuits that sit between the memory unit and the processor and that hold the key necessary to decrypt/encrypt the data from/to memory, and no other place (including the operating system) stores the key. Special atomic instructions ensure that these registers are the only place where the key is stored. Intel has commercialized this approach as part of its Software Guard Extensions (SGX) solution. SGX is a set of instructions that allows user-level code to allocate an enclave, which unlike normal process memory, is also protected from processes running at higher privilege levels.

Yet another approach to protecting data-in-use involves cryptographic protocols. Several cryptographic tools, including secure multi-party computation and homomorphic encryption, allow for the private computation of data on untrusted systems. In these approaches, data-in-use can be operated upon while encrypted and never exposed to the system that is doing the processing.

There remains a need to adapt computing systems to provide for flexible security measures that protect data-in-use, data-in-motion and data-at-rest. This disclosure addresses that need in the context of one such system, namely, a disaggregated computing system, as is now described.

BRIEF SUMMARY

According to this disclosure, a group of processors in a processor pool comprise a secure "enclave" in which user code is executable and user data is readable solely with the enclave. This is facilitated through the key management scheme described that includes two sets of key-pairs, namely: a processor group key-pair, and a separate user key-pair (typically one per-user, although a user may have multiple such key-pairs). The processor group key-pair is associated with all (or some define subset of) the processors in the group. This key-pair is used to securely communicate a user private key among the processors. The user private key, however, is not transmitted to non-members of the group. Further, preferably the user private key is refreshed periodically or upon any membership change (in the group) to ensure that non-members or ex-members cannot decipher the encrypted user key.

The above-described technique ensures secure communication within, in to, and out of, the enclave, because the processor group key-pair is used to communicate the user decipher user key among the processors.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

The techniques of this disclosure preferably are implemented within the context of a "disaggregated" compute system wherein a "disaggregated server"—sometimes referred to herein as a "server entity"—is composed or constitutes server resources selected from (or assigned from) shared server resource pools, namely, one or more of: a compute pool, a memory pool, an accelerator pool (e.g., a GPU accelerator, a network accelerator, etc.), a storage pool, and, as will be described below, a security-augmented (or "secure") processor pool. As the nomenclature suggests, a "compute" pool typically constitutes physical processors (such as CPUs), a "memory" pool typically constitutes physical memory devices (such as dual-inline-memory modules (DIMM)), etc. A given shared pool preferably includes just the particular resource types, but a particular resource pool may be composed of one or more resource sub-types. The notion of a "pool" is not intended to be limiting, as the common resources may be collected, aggregated or otherwise combined in any suitable manner. Further, a "pool" may be a dedicated set of resources that have the common type or sub-type, or some ad hoc collection of such resources. Preferably, a particular server entity comprises server resources from one or more of the server resource pools.

In a preferred embodiment, and as now described below, a disaggregated compute system in which the teachings of this disclosure are practiced utilizes optical interconnects for memory, although this is not a limitation.

Typically, the shared resource pools are available within the physical confines of a particular data center, although this likewise is not a limitation. Thus, the shared resource pools themselves may be shared across physical data centers. Further, a particular server entity is not required to be composed of resources from each of the server pools.

Disaggregated Server Systems

The following provides additional details regarding disaggregated compute system management and use.

In this approach, preferably resources in or across one or more data centers are disaggregated into shared resource pools, namely, one or more of: a compute pool, a memory pool, an accelerator pool, a storage pool, and the like. Servers preferably are constructed dynamically, for example, on-demand and based on workload requirements, by allocating from these resource pools. Preferably, a disaggregated compute system of this type keeps track of resources that are available in the shared resource pools, and manages those resources based on that information.

A tracking mechanism associated with the disaggregated compute system typically includes a database. The database stores data that tracks resource state or status (e.g., idle or used CPUs, memory, accelerator, and other components) of the various resources that define a server available from the resource pools. Additionally, the database stores a data record (or, more generally, a data set) that, for each defined server (sometimes referred to as a "server entity"), identifies the resources (e.g., the CPU(s), memory, accelerator, or other components) that comprise the server. Preferably, the data record is associated with an identifier, such as a unique server ID, and each resource that comprises the server is associated in the database with that unique server identifier. The individual components of the resource pools also include identifiers that are tracked in the database. The resource-specific identifiers provide information regarding the resource status, attributes, relationship to other resources, and the like. Thus, the database, which may be centralized or distributed, acts a repository of information regarding server entities, the server pools, and the various resources that comprise a particular server entity.

In response to a request for data center resources, e.g., when allocating a new server, a server entity is defined by selecting resources from the one or more resource pools. The resources may be selected based on a projected need or specified demand associated with the request, or some other criteria. The server entity is associated with the unique server ID, which is stored in the database together with the identifiers for the resources that comprise the server entity. The server entity may then be scaled up or down as necessary based on the workload requirements of the request or one or more related or associated requests.

Thus, for example, as the request is processed, or as additional related requests are received for processing, the tracking system monitors usage to determine if an adjustment to the resources comprising the server entity is needed. When, based on the monitoring, the tracking system determines that an adjustment in the server entity components is necessary, the adjustment is carried out, e.g., by changing the allocation of resources that are associated with the server entity. Thus, for example, when additional compute and memory are needed (scale-up), the tracking system (by itself, or by cooperation with other resource provisioning systems in the data center) adjusts the server entity, e.g., by selecting additional processors and memory, which are then added to the server entity. These additional processors and memory may be selected based on one or more criteria, such as load, proximity to the existing resources that comprise the server entity, availability, and the like, as indicated by the information being maintained and tracked in the database. When, on the other hand, the monitoring indicates that fewer resources are required (scale-down), the tracking system adjusts the server entity, e.g., by de-selecting certain processors and memory, which are then de-allocated from the server entity and returned to their respective resource pools.

Figure 1:
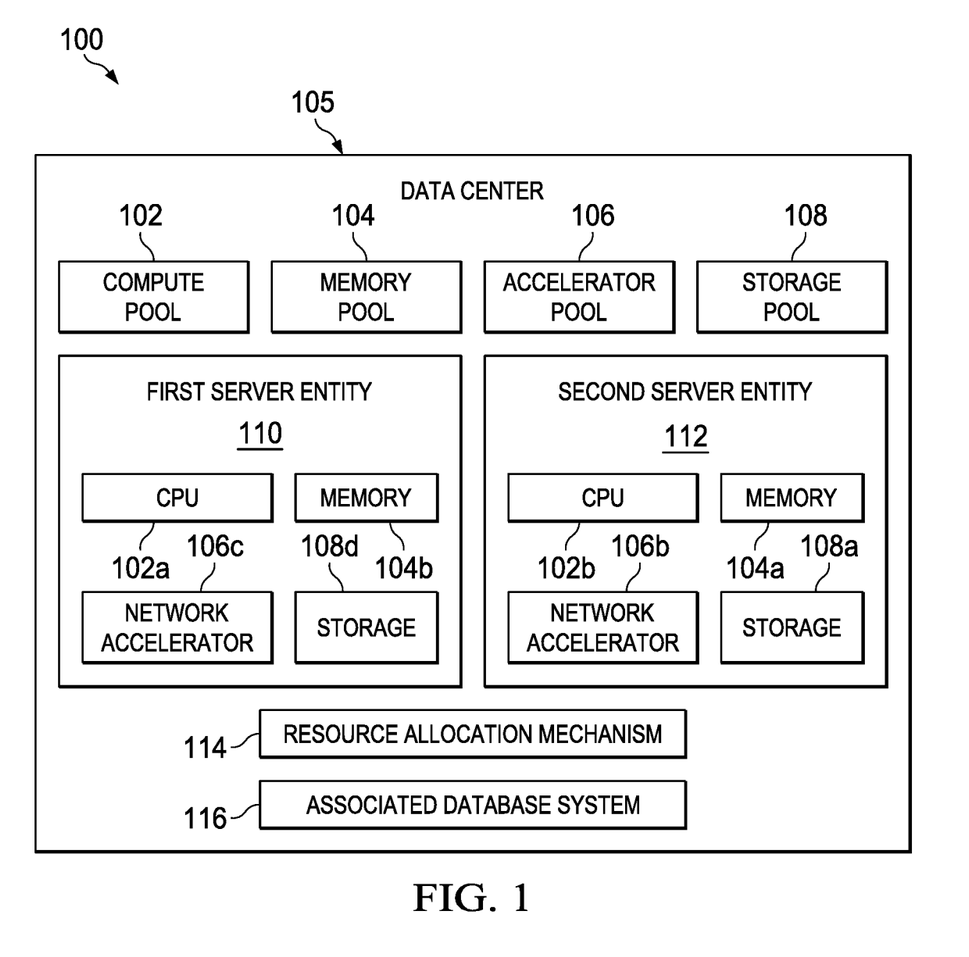
FIG. 1 depicts a data center architecture in which the techniques of this disclosure may be implemented.

With reference now to FIG. 1, a method and system for specifying a disaggregated compute system 100 in this manner is depicted. In one approach, the disaggregated compute system 100 is configured within a data center 105 in which a switching optically-connected memory architecture is used, although this is not a limitation as the disaggregate server approach can be implemented in a conventional cloud (public, private or hybrid) environment. In the disaggregated compute system 100, there are shared server pools, e.g., a compute pool 102, a memory pool 104, an accelerator pool 106, a storage pool 108, and perhaps others. There may be a single instance of a resource pool, or multiple such instances (sometimes referred to as "multiple pools"). In the approach herein, particular servers that service customer workloads are constructed dynamically, for example, on-demand and based on workload requirements, by allocating from these resource pools. Thus, for example, a first server entity 110 may comprise CPU 102a (selected or otherwise obtained from compute pool 102), memory 104b (selected or otherwise obtained from memory pool 104), accelerator 106c (selected or otherwise obtained from accelerator pool 106), and storage 108d (selected or otherwise obtained from storage pool 108). A second server entity 112 may comprise CPU 102b, memory 104a, accelerator 106b and storage 108a. These examples are merely representative. The particular server pool resources that comprise a given server entity may change.

Preferably, once a particular resource of a resource pool is associated with a given server entity, that particular resource is not available to be used to constitute another server entity. Stated another way, preferably an allocated resource of a resource pool remains associated with the server entity until it is de-allocated, at which point the resource is returned back to the resource pool and can be used again by another server entity. Although not intended to be limiting, preferably a server entity (once created) is associated with one and only one data center customer (tenant). In other words, server entities preferably are not shared across tenants.

To manage such allocations and de-allocations, the disaggregated compute system 100 has the capability to keep track of resources that are available in the shared server resource pools and that are allocated or de-allocated to the various server entities. To this end, the disaggregated compute system 100 comprises (or has associated therewith) a tracking system comprising a resource allocation mechanism 114, and an associated database system 116. Generally, the tracking system is implemented as a data processing system, and it may operate in a standalone manner or as a component of some other system or functionality in the data center.

Typically, the resource allocation mechanism 114 is implemented in software, namely, as set of computer program instructions, executing in one or more hardware processors. The resource allocation mechanism 114 may comprise one or more sub-systems or modules, processes, programs or execution threads, and such components may be co-located or distributed. The resource allocation mechanism 114 generally is responsible for executing one or more allocation algorithms that create and manage server entities. Representative algorithms include, for example, a new server allocation algorithm that is used to perform an initial build of the server entity, a server scale-up algorithm that in the case of an existing server is used to add more resources to the existing server entity when more capacity is needed to handle the workload, and a server scale-down algorithm that in the case of an existing server is used to de-allocate (shed) resources from the existing server entity when less capacity is needed to handle the workload.

The one or more algorithms that comprise the resource allocation mechanism 114 used information stored in the database system 116 to carry out the management functions. The database system 116 stores information that tracks the state, status or other properties and attributes of the various resources in the shared server pools. In addition, the database stores information about each server entity built by the resource allocation mechanism.

Flexibly Secure Computing Systems in a Disaggregated Environment

With the above as background, the techniques of this disclosure are now described.

According to an aspect of this disclosure, and as noted above, the shared resource pools are expanded to include a security-augmented (or "secure") processor pool. The secure processor pool may be a subset of the processor pool, or its own standalone resource pool. The secure processor pool is dedicated to secure processors that are capable of carrying out cryptographic (or similar) operations, although these secure processors may also be used to process data in the clear. Secure processors typically are implemented in hardware, and a given secure processor from the pool typically is implemented as a processor chip that comprises a CPU core, together with supporting devices (e.g., processor memory (caches), I/O, etc.).

As described above, disaggregated servers (the server entities) are constructed dynamically, on-demand and based on a tenant's workload requirements, by allocating from these resource pools. When the workload (typically executable code and/or data) is such that security requirements are dictated or must otherwise be enforced, a disaggregate server is constructed to include one or more secure processors drawn from this secure processor pool.

Figure 2:
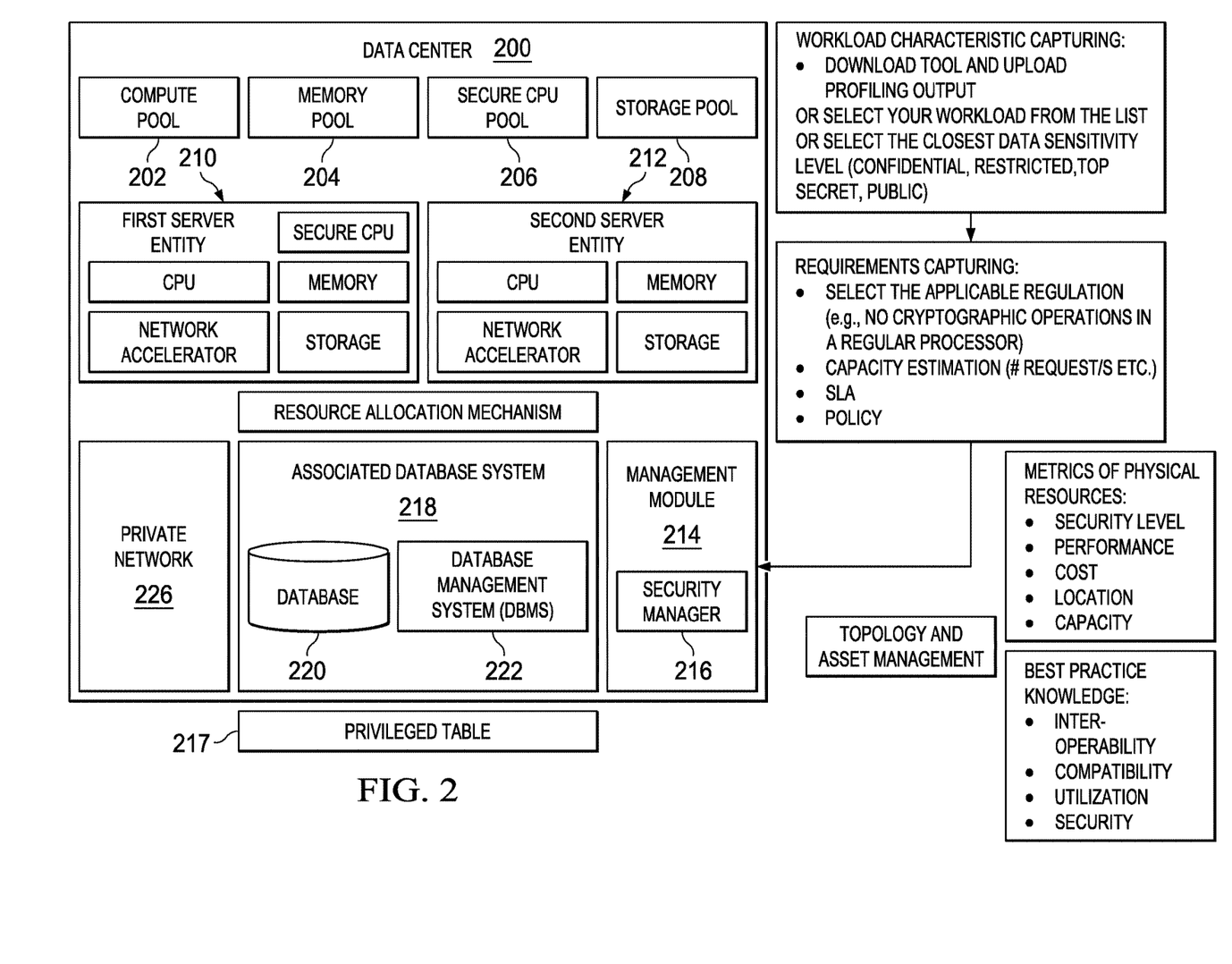
FIG. 2 depicts the architecture of FIG. 1 that is augmented to include secure processor resource pools together with a management infrastructure according to this disclosure.

Thus, and with reference to FIG. 2, an embodiment of a disaggregate compute system 200 includes the elements shown in FIG. 1 including the compute pool 202, the memory pool 204, the storage pool 208, as well as a secure processor pool 206 that includes secure hardware resources that perform cryptographic operations. First and second server entities 210 and 212 are configured as before, except that a particular server entity (e.g., 210) is also configured to include a secure processor from the pool 206. The system also includes a resource allocation mechanism in the form of a management module 214 that includes a security manager 216. As in FIG. 2, the system includes an associated database system 218 having a database 220 and database management system 222 for storing information useful in provisioning, administration and operations. Some of the information stored in the database include topology and asset management data, metrics of physical resources (e.g., security level, performance, cost, location, capacity, etc.), a knowledgebase of best practices (e.g., concerning interoperability, compatibility, utilization and security, etc.) and so forth.

The management module 214 is part of a management layer that includes a separate, privileged network 226 that, preferably, is not accessible by a user or otherwise from outside the data center (e.g., the public Internet). The management layer facilitates and manages the provisioning and use of servers that include the secure processors (such as server entity 210 but not server entity 212) to ensure that sensitive data in the workload is not exposed, either to physical attack or to other software executing on the disaggregated system.

As used herein, a workload typically includes executable code and data. When that executable code and data needs to be secured according to some security requirement that dictates processing within a server entity (or "target server") that includes a secure processor, the code may be packaged as a secure object, sometimes referred to herein as well as a "secure executable." When such security constraints are required, a security goal will be to ensure that the secure executable and its data are only visible in the clear when a CPU in a secure processor is executing the secure executable, but that the secure executable code and its data are encrypted elsewhere (e.g., within a memory instance from the memory resource pool). In addition, when a secure object is being held in memory or other data storage (drawn respectively from the memory or storage pools), another security goal is to ensure that the contents thereof are not accessible (in the clear) by other software. Thus, while a particular memory from the memory resource pool can hold multiple secure objects, each of the secure objects are protected from one another, as well as from other software in the disaggregate compute environment.

Referring back to FIG. 2, through its security manager 216, management module 214 is responsible for receiving workload security requirements, data sensitivity characteristics, information about available resources in the pools, and the like, and in response determining a composition of a server having the secure processors or other resources needed for processing the workload and enforcing the security requirements. To this end, the management module 214 may include a tool or other interfaces for capturing workload characteristics. The tool may expose one or more user interfaces by which a user can select a workload from a list, and then associate an appropriate data sensitivity level (e.g., confidential, restricted, top secret, public, etc.) for use when the workload is processed. The management module preferably also exposes an interface by which the user can identify one or more security requirements such as "no cryptographic operations in a regular processor," "perform cryptographic operations with a secure processor of type x," etc. Other workload processing requirements (e.g., capacity estimation, SLA, policy, etc.) may also be specified, or selected from default options. The information is captured and stored in the database 220.

Prior to runtime, the management module uses such information, as well as information about data center topology, availability of resources, physical resource metrics, data center best practices, etc. to compose the initial server entity that will be used to process the workload. The "resource allocation" mechanism described above with respect to FIG. 1 may be used for this purpose. Processing of the workload then begins.

As noted above, during runtime execution of the workload, the server composition may need to be modified (e.g., scaled-up or scaled-down), in which case the security manager 216 also needs to keep track of all available secure hardware resources and their tenant workload mappings so that adjustments to the server entity can be made as necessary. This adjustment process may be carried in the manner described above with respect to FIG. 1 using the security manager to perform resource allocation.

As adjustments to the server entity occur, however, any secure executable needs to remain protected, whether "in-use," "in-motion" or "at-rest." To this end, and according to this disclosure, the security manager 216 uses its associated privileged network 226 to communicate cryptographic key information to local processor memories (caches) associated with each secure processor in which the sensitive data may be processed. (These local memories are on the processor chip and thus should be distinguished from the memory drawn from the memory pool). The keys are used to protect the sensitive information and, in particular, to ensure that the code is only available in the clear within a secure processor whose CPU is executing that code.

Figure 3:
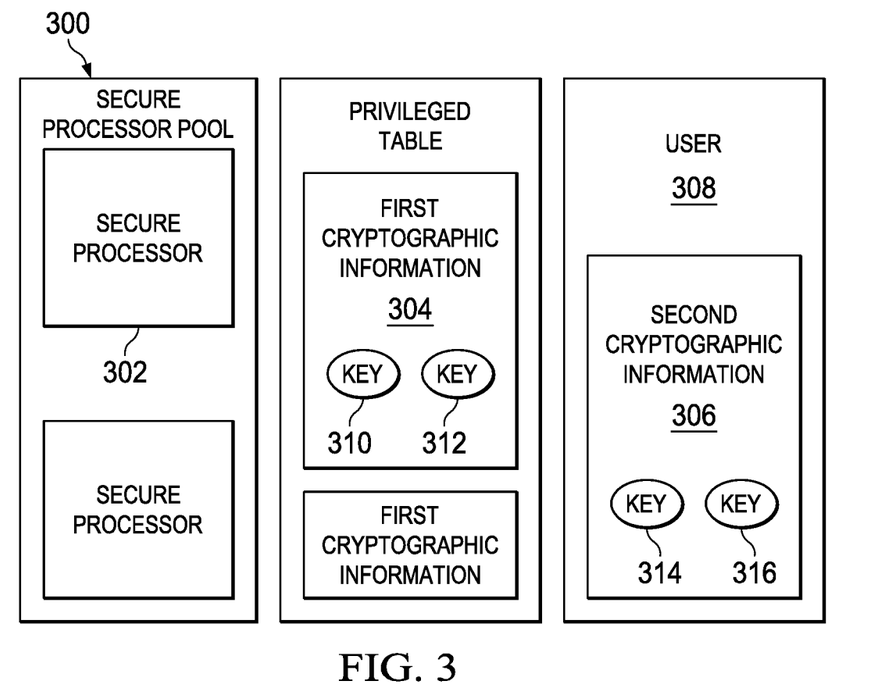
FIG. 3 depicts a key management scheme according this disclosure wherein each processor in a processor pool has a shared key (of a key-pair), referring to herein as a processor group private key.
Figure 4:
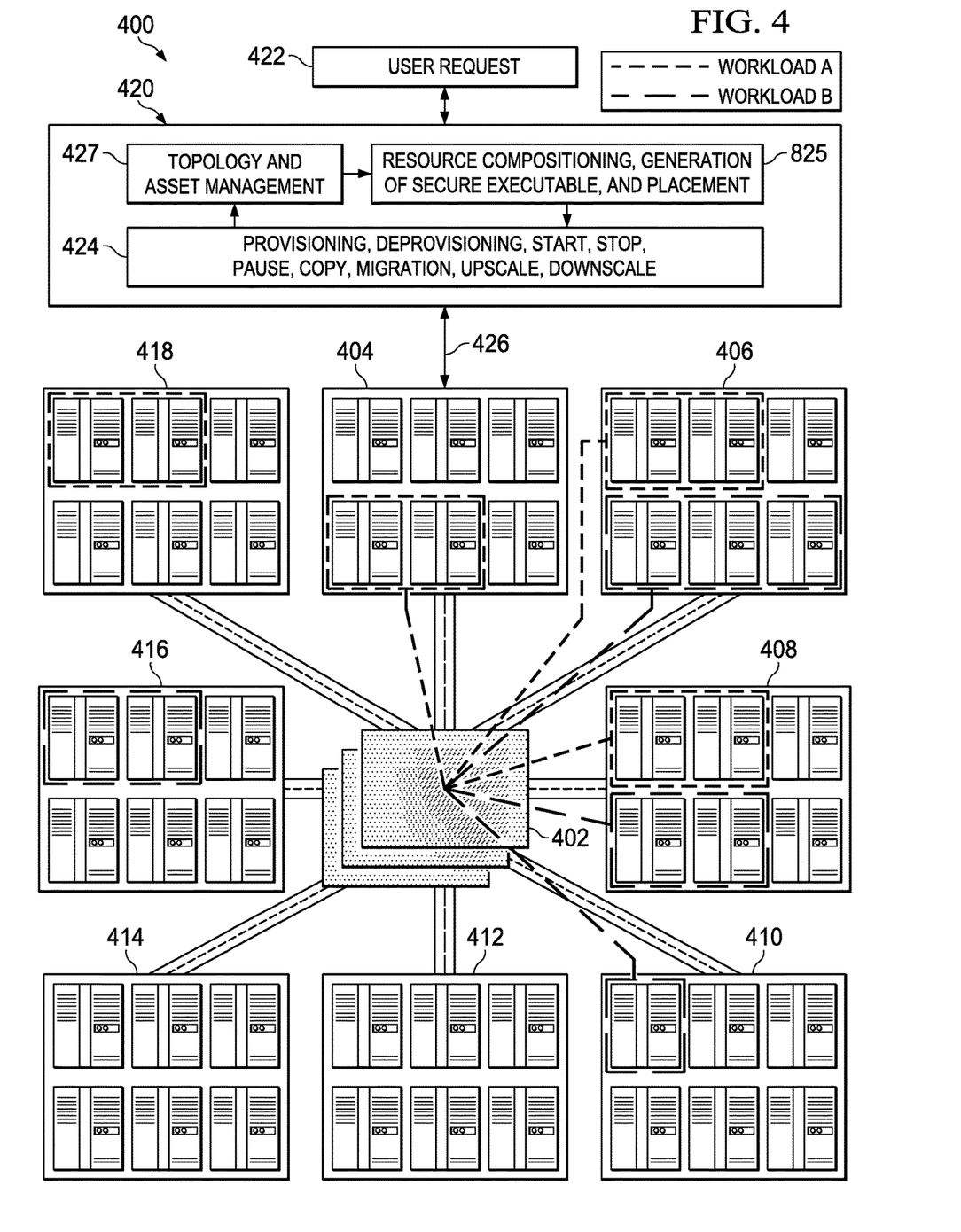
FIG. 4 depicts a representative implementation of server entities that are provisioned to include secure processors from the secure processor resource pool using one of the key management schemes described.

Within the above-described operating context, preferably there are two (2) distinct types of cryptographic information as depicted in FIG. 3: first cryptographic information 304 associated with each processor 302 within a processor pool 300, and second cryptographic information 306 associated with an individual user (e.g., a tenant, or an individual associated with a tenant) 308 and used to secure information that the user desires to maintain private. The first cryptographic information 304 preferably comprises a key-pair that includes a private key 310 and its associated public key 312. The key-pair 304 and thus the private key 310 therein is shared by all of the processors 302 in the processor pool 300. Thus, in this embodiment there is just one private key 310 (and its related public key 312) associated with all of the processors 302 that comprise a processor group. The second cryptographic information 306 also preferably comprises another key pair (private key 314 and related public key 316) associated with the individual user. The private key 314 of the individual user key pair is known only to the individual user (or an entity trusted thereby). The security manager does not know and cannot ascertain the individual user private key 314.

The processor group private key 310 comprising part of the first cryptographic information is to securely communicate user keys (the second cryptographic information associated with the individual user(s)) among the processors that comprise the processor pool (in this context, a processor group).

The processor group may comprise a processor pool or rack, or even an entire data center. The approach of using a single key-pair for all processors in the processor group makes key management simpler and more scalable as compared to having dedicated key-pairs for each processor in the pool.

In the approach herein, the processor group private key of course is distinct from the private key of each key-pair in the second cryptographic information.

Preferably, the source of trust for the public key in each key-pair preferably comes from a digital certificate signed by root-of-trust (e.g., Verisign).

In a further variant, the first cryptographic information need not be a "key-pair" but, rather, may be a single secret key that is shared by the processors in the processor group.

As used herein, the public part of the user key-pair is sometimes referred to herein as a user decipher key, whereas the private part of that key-pair is sometimes referred to the user encryption key.

Typically, the cryptographic key information is made available to the participating entities as needed in advance of any movement or positioning of the workload in the server entity, although this is not a requirement.

The individual processors (each of whom share the same processor group private key) can pass information directly and in a secure way as long as they are known to be authorized by the security manager. This authorization may be explicit or implicit, the latter case by virtue of the security manager having distributed the processor group key to a particular processor.

According to this disclosure, a group of processors in a processor pool comprise a secure "enclave" which user code is executable and user data is readable solely with the enclave. This is facilitated through the key management scheme described that includes two sets of key-pairs, namely: the processor group key-pair, and a separate user key-pair (typically one per-user, although a user may have multiple such key-pairs). As noted, the processor group key-pair is associated with all (or some define subset of) the processors in the group. This key-pair is used to securely communicate a user private key among the processors. The user private key, however, is not transmitted to non-members of the group. Further, preferably the user private key is refreshed periodically or upon any membership change (in the group) to ensure that non-members or ex-members cannot decipher the encrypted user key. In this key management scheme, the security manager is trusted and preferably has the following responsibilities: (1) creating the processor group; (2) controlling admission into the processor group; (3) creating and distributing the processor group key-pair within the members of the processor group; and (4) ensuring freshness of the processor group key-pair and processors join or leave the group. A distributed group key protocol may be used for this purpose.

In particular, and to ensure secure construction of the enclave, preferably the security manager implements an admission protocol or decision process for deciding whether a processor seeking to join the group is or is not legitimate. As noted above, preferably the security manager is also the authority that installs the private part of the processor group key-pair in each processor when the processor is admitted to the group. Periodically, the security manager refreshes the processor group key-pair to avoid risks associated with staleness. Further, the security manager refreshes the processor group key-pair upon any membership change. In one embodiment, the security manager achieves this by maintaining an inventory of legitimate processors, e.g., based on serial numbers obtained from approved manufacturers. The admission protocol implemented by the security manager preferably permits only processors in that inventory to be allowed to join the enclave. The admission protocol ensures that an unauthorized or illegitimate processing unit (e.g., like a FPGA box or a hacker-installed appliance) will not be able to join the enclave and obtain the processor group key-pair used for transferring the user key-pair. Only processors that are legitimate and part of the processor pool, and recognized as such by the trusted security manager, may obtain these individual user key-pairs. Here, all members of the group get the same key-pair, but as noted above the key-pair can be changed periodically.

The above-described technique ensures secure communication within, in to, and out of, the enclave, because the processor group key-pair is used to communicate the user decipher user key among the processors. When the user key-pair has to be transferred from one processor (P1) to another (P2) in the same enclave, the sending processor encrypts the user decipher key using the public part of the processor group key-pair. Because the private key of the processor group key-pair is visible to all authorized processors in an enclave, P2 is able to decrypt the user key-pair. Only the user program in the enclave can be executed in the enclave, however. For executing a program (e.g., by a virtual machine (VM), the operating system (OS), or an application), the user encrypts the program using the private part of the user's key-pair. To that end, the user encrypts his or her program and/or data using the user encryption key. The decipher key known to the members of the processor group returns the encrypted program/data to be executed in the enclave as needed.

It should be noted that the user encryption key is the secret that only the user has; if that key is transferred to others, then others can install parts of a program into the enclave that can compromise the security. This of course is undesirable. The notion here is that anything in the enclave must pass through the decipher user key mechanism. In this manner, no other entity or person knows how to encrypt something that can pass as an executable program, because they do not have that other user key. This ensures defense of the enclave, i.e., restricting the code executed within the enclave to code belonging to authorized users.

As noted, the processor public/private keys (the group key-pair) are only used to transfer a user's decipher key from one processor to another securely by encrypting it for such transfer at the old processor owner of the user key, and transferring it to the new processor (that received the user's memory switched to it) securely. Then, that new processor uses the other key to install the user key, e.g., in its memory decipher unit.

The management module and its security manager may be a system, sub-system, device, process, program or combination thereof. Various functions that comprise the management module and its security manager may be integrated, co-located or remote from one another. One or more functions or sub-functions may be components of other systems. Thus, the particular implementation for the management module and its security manager is not intended to be limited by any such constraints.

Figure 5:
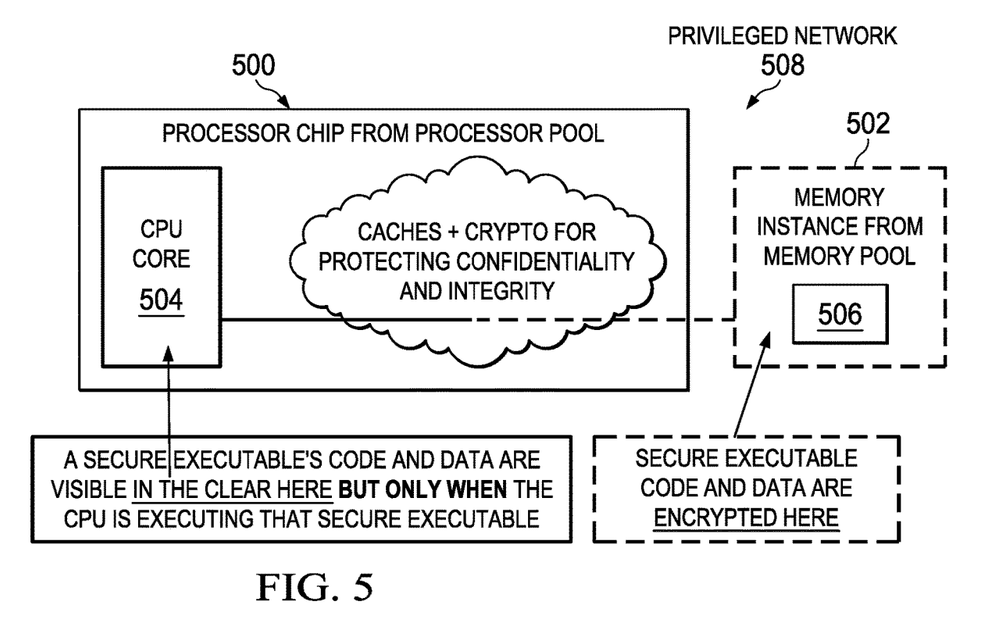
FIG. 5 depicts a secure processor configured in association with a memory instance according to this disclosure.

FIG. 5 depicts a system architecture showing how information (e.g., a secure executable and its data) are protected throughout the environment regardless of whether it is "in-use," "in-motion" or "at-rest." More generally, the techniques herein ensure that the workload is cryptographically-protected whenever it is external to (in other words, "outside") one of the secure processors (and its associated secure processor memory). In the example shown in FIG. 5, the disaggregate compute system 500 comprises a number of resource pools connected by the optical switch fabric 502. These resource pools include, working clockwise, a first conventional processor pool 504, a memory pool 506, a storage pool 508, a first secure processor pool 510 (e.g., of Type 1), a second conventional processor pool 512, a I/O resources pool 514, a second storage pool 516, and a second secure processor pool 518 (e.g., of Type 2). Of course, the number of such pools, their identities, and their configuration, may vary.

As depicted, and for example purposes only, there are two (2) workloads executing on two server entities, with workload A executing on a server entity composed of resources from secure processor pool 518, processor pool 504, memory pool 506 and storage pool 508, and workload B executing on a server entity composed of resources from memory pool 506, storage pools 508 and 516, and secure processor pool 510. Of course, these server entity compositions are merely exemplary. As also shown, the management module 520 is responsive to the user requests 522 for instantiating and managing the server entities. As depicted, the resource allocation includes various functions 524, such as provisioning, start, stop, pause, copy, migration, scale-up, and scale-down. The management module also is responsible for composing the resources necessary to generate the server entity, generation of the secure executables (by applying the owner's symmetric key), and the placement of those executables with the secure processors, all as depicted at function 525. The placement of the secure executable is facilitated using the privileged network 526, as previously noted. As also depicted, as the server entities are configured, or as those configurations as adjusted dynamically, information is reported back to a topology and asset management function 527, which keeps track of available resources from the resource pools.

FIG. 6 depicts a secure processor 600 drawn from the secure hardware pool, and a memory 602 drawn from the memory pool. As shown, the secure processor 600 includes a CPU core 604 in which the secure executable and data 606 are visible in the clear, but only when the CPU core 604 is executing the secure executable. Prior to such execution, the secure executable code and data 606 are stored in the memory 602 in an encrypted form such that the code and data are not visible to other software or other such secure objects. The secure executable code and data 606 also are not visible as they are transferred from the memory 602 to the CPU core 604. As noted above, preferably the secure executable and data 606 are placed in the memory 602 by the management module using the privileged network 608.

When the security manager builds secure object software for a target machine (and, in particular, a secure processor in a disaggregate server entity), preferably the building is done in a secure environment, meaning that the both the secure object under construction and the construction process itself are not subject to attack (physical- or software-based).

The techniques described herein provide significant advantages. In particular, the approach here facilitates secure construction of the enclave. The technique also provides for securely transferring the user code and data among the processors constituting the enclave, as well as into and outside the enclave. The approach thus facilitates secure communication to and from the enclave. Finally, the approach restricts the code executed within the enclave to code belonging to authorized users, thus providing a degree of defense not otherwise available in an enclave. In this manner, the technique provides for enclaves to be implemented in a manner that is scalable across large number of processors. Further, the method is simpler and more practical for the user to take advantage of as compared to prior techniques. In this approach, even the operating system of the processor cannot access the enclave secret, which is the private part of the user key. In this approach, what runs in the enclave is restricted to only what the user has provided, and not even a privileged program like the operating system can obtain access to the user data.

By way of example only, the security manager described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various data center architectures including simple n-tier architectures, web portals, federated systems, and the like. The herein also may be practiced in a loosely-coupled server (including a "cloud"-based) environment, whether, private, public, or hybrid.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the security manager is implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The security manager (or components thereof) may be part of the management module or a separate resource allocation mechanism. The security manager may operate as a standalone service that is used by multiple data centers that implement disaggregate compute environments. In addition, the pool of secure processors may be shared across data centers.

The techniques herein generally provide for the above-described improvements to a technology or technical field, as well as the specific technological improvements to workload management schemes, such as described above.

The invention claimed is:

1. A method to securely transfer computation in a disaggregated compute environment comprising a set of resource pools including a secure processor pool, comprising:
   associating a set of processors drawn from the secure processor pool as an enclave; associating a first key-pair with each of the set of processors in the enclave, the first key-pair including a private key that is shared by the each of the processors, the private key having an associated public key;
   receiving user code and data within a first processor in the enclave, the user code and data being secured by a second key-pair uniquely associated with a user, the second key-pair including a decipher key;
   in association with a transfer of the user code and data from a first processor in the enclave to a second processor in the enclave that shares the first key-pair, encrypting the decipher key using the private key and passing the encrypted decipher key from the first processor to the second processor;
   adjusting a membership of the set of processors in the enclave, wherein adjusting the membership includes:
      determining whether a new processor has an authorization to join the enclave; and
      when the new processor has the authorization, associating the new processor to the set of processors in the enclave; and
      refreshing the first key-pair following association of the new processor to the set of processors.

2. The method of claim 1, further including securely transferring the user code and data from the second processor boa processor outside the enclave.

3. The method of claim 1, wherein adjusting the membership includes removing a processor from the set of processors in the enclave and returning the removed processor to the secure processor pool.

4. The method of claim 1, further including executing the user code in the enclave, wherein the user code is executed by decrypting the encrypted decipher key using the public key to recover the decipher key, and then applying the decipher key to decrypt the user code.

5. A system to securely transfer computation in a disaggregated compute environment comprising a set of resource pools including a secure processor pool, comprising:
   one or more hardware processors;
   computer memory holding computer program instructions executed by the hardware processors and operative to:
      associate a set of processors drawn from the secure processor pool as an enclave;
      associate a first key-pair with each of the set of processors in the enclave, the first key-pair including a private key that is shared by the each of the processors, the private key having an associated public key;
      receive user code and data within a first processor in the enclave, the user code and data being secured by a second key-pair uniquely associated with a user, the second key-pair including a decipher key;
      in association with a transfer of the user code and data from a first processor in the enclave to a second processor in the enclave that shares the first key-pair, encrypt the decipher key using the private key and passing the encrypted decipher key from the first processor to the second processor;
      adjust a membership of the set of processors in the enclave, wherein adjusting the membership includes:
         determining whether a new processor has an authorization to join the enclave; and
         when the new processor has the authorization, associating the new processor to the set of processors in the enclave; and
      refresh the first key-pair following association of the new processor to the set of processors.

6. The system of claim 5, wherein the computer program instructions are further operative to securely transfer the user code and data from the second processor to a processor outside the enclave.

7. The system of claim 5, wherein the computer program instructions to adjust the membership includes program code operative to remove a processor from the set of processors in the enclave and return the removed processor to the secure processor pool.

8. The system of claim 5, wherein the computer program instructions are further operative to execute the user code in the enclave, wherein the user code is executed by decrypting the encrypted decipher key using the public key to recover the decipher key, and then applying the decipher key to decrypt the user code.

9. A computer program product in a non-transitory computer readable medium for use in a data processing system to securely transfer computation in a disaggregated compute environment comprising a set of resource pools including a secure processor pool, the computer program product comprising computer program instructions operative to:
   associate a set of processors drawn from the secure processor pool as an enclave;
   associate a first key-pair with each of the set of processors in the enclave, the first key-pair including a private key that is shared by the each of the processors, the private key having an associated public key;
   receive user code and data within a first processor in the enclave, the user code and data being secured by a second key-pair uniquely associated with a user, the second key-pair including a decipher key;
   in association with a transfer of the user code and data from a first processor in the enclave to a second processor in the enclave that shares the first key-pair, encrypt the decipher key using the private key and passing the encrypted decipher key from the first processor to the second processor;
   adjust a membership of the set of processors in the enclave, wherein adjusting the membership includes:
      determining whether a new processor has an authorization to loin the enclave; and
      when the new processor has the authorization, associating the new processor to the set of processors in the enclave; and
   refresh the first key-pair following association of the new processor to the set of processors.

10. The computer program product of claim 9, wherein the computer program instructions are further operative to securely transfer the user code and data from the second processor boa processor outside the enclave.

11. The computer program product of claim 9, wherein the computer program instructions to adjust the membership includes program code operative to remove a processor from the set of processors in the enclave and return the removed processor to the secure processor pool.

12. The computer program product of claim 9, wherein the computer program instructions are further operative to execute the user code in the enclave, wherein the user code is executed by decrypting the encrypted decipher key using the public key to recover the decipher key, and then applying the decipher key to decrypt the user code.

\* \* \* \* \*